May 2, 1933.   T. V. BUCKWALTER   1,906,529
ROLLER BEARING AXLE
Filed Aug. 17, 1929   3 Sheets-Sheet 2
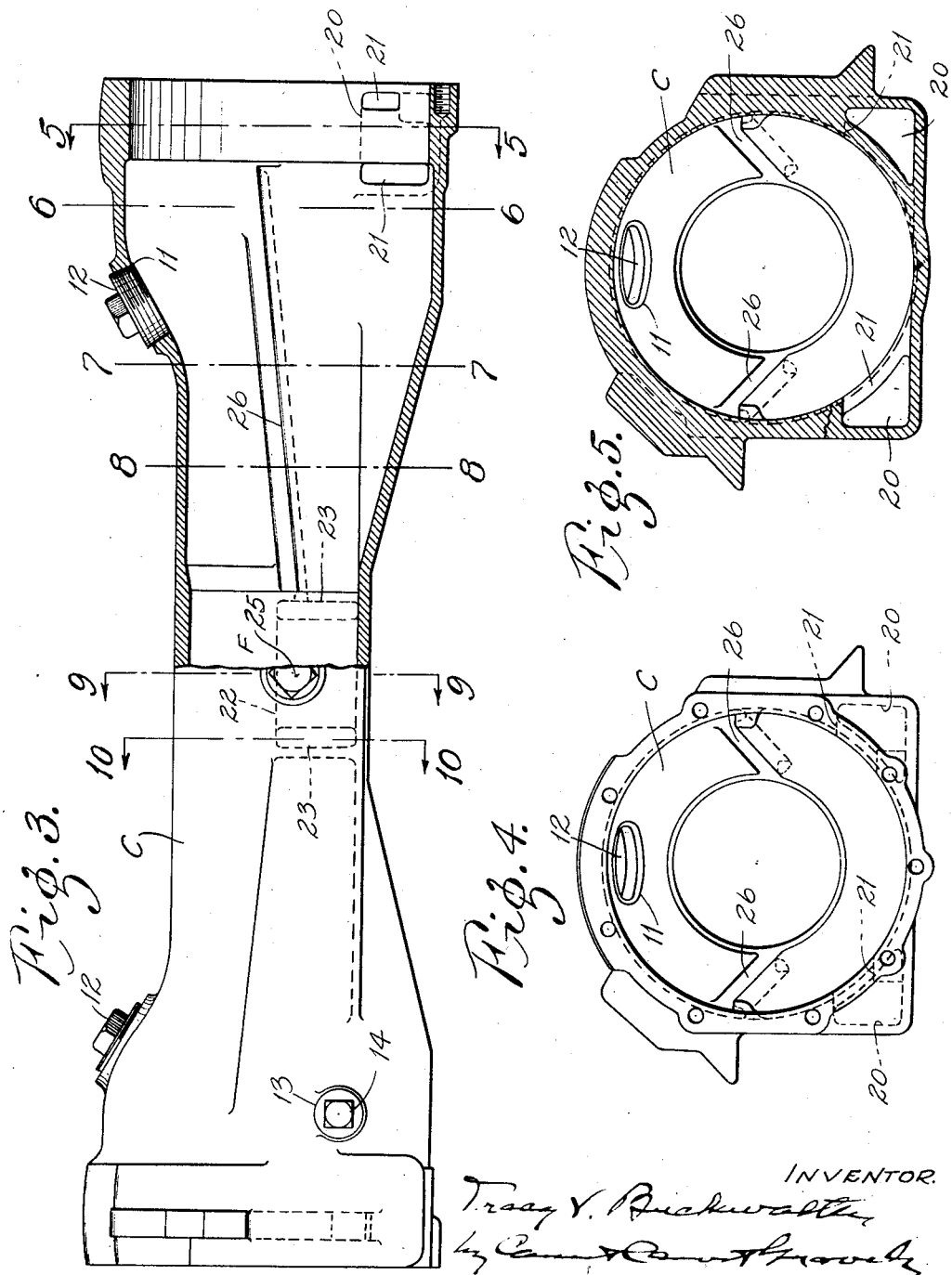
INVENTOR.
Tracy V. Buckwalter
HIS ATTORNEYS

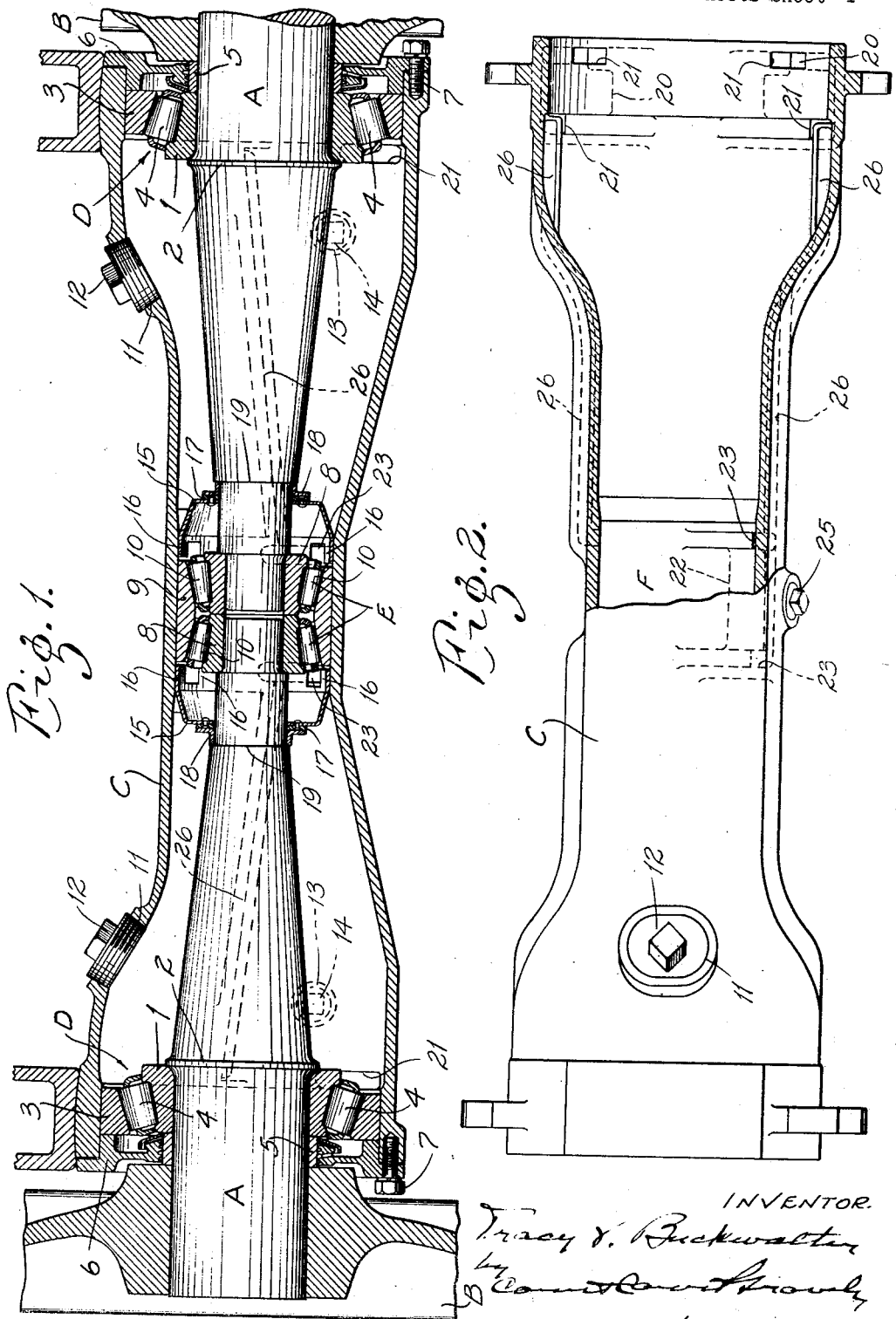

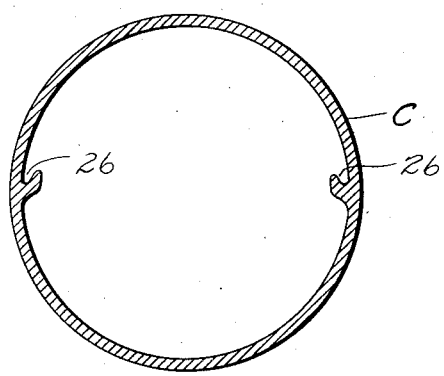
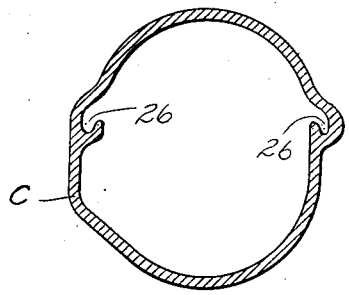
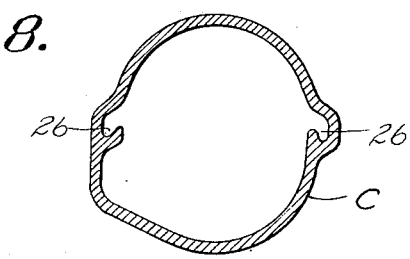
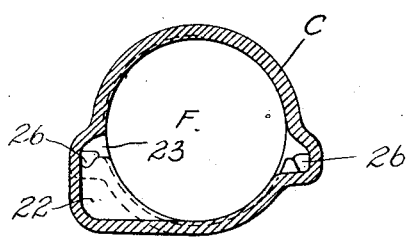
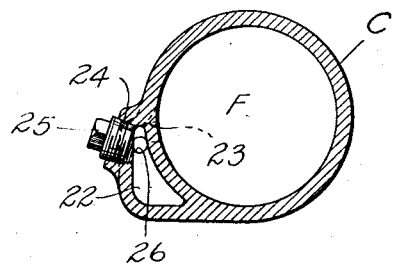

Patented May 2, 1933

1,906,529

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

ROLLER BEARING AXLE

Application filed August 17, 1929. Serial No. 386,602.

This invention relates to roller bearing axles of the differential type wherein the wheels are fixed to axle sections that are mounted within a housing with roller bearings interposed between said sections and said housing at the middle and at the ends of the latter. The principal object of the present invention is to provide an axle of the above type with means for supplying lubricant from the end bearings to the middle bearings. Another object is to provide for the return to the end bearings any surplus of oil in the middle bearings. Other objects are simplicity and cheapness of construction and compactness of design. The invention consists in the roller bearing axle construction and in the construction, combinations and arrangements of parts hereinafter described and claimed.
In the accompanying drawings, which form part of this specification and wherein like symbols refer to like parts wherever they occur, Fig. 1 is a vertical longitudinal section through a roller bearing axle construction embodying my invention, Fig. 2 is a half plan half horizontal sectional view of the axle housing with the bearings and axle removed, Fig. 3 is a half side half vertical section of said housing, Fig. 4 is a view looking at one end of said housing, Fig. 5 is a vertical cross-section on the line 5—5 in Fig. 3, Fig. 6 is a vertical cross-section on the line 6—6 in Fig. 3, Fig. 7 is a vertical cross-section on the line 7—7 in Fig. 3, Fig. 8 is a vertical cross-section on the line 8—8 in Fig. 3, Fig. 9 is a vertical cross-section on the line 9—9 in Fig. 3, and Fig. 10 is a vertical cross-section on the line 10—10 in Fig. 3.

Referring to the accompanying drawings, my invention is shown in connection with a railway axle construction comprising axially alined counterpart axle sections A having road wheels B fixed on the outer ends thereof and mounted in a lubricant containing axle housing C, with conical roller bearings D interposed between the axle sections and the ends of the housing, and with conical roller bearings E interposed between the adjacent inner ends of the axle sections and the middle portion of said housing.

The roller bearings D for the outer ends of the axle sections A comprise cones or inner bearing members 1 pressed on said sections and abutting against shoulders 2 thereon, cups or outer bearing members 3 mounted in the enlarged or flared ends of the axle housing C, and conical rollers 4 interposed between said cups and cones.

Suitable spacing collar members 5 are sleeved on the axle sections between the hubs of the wheels B and the small ends of the bearing cones 1; and the enlarged or flared ends of the axle housing C are closed by means of annular closure plates or rings 6, which surround said spacing collars and are removably secured to the ends of said axle housing by means of cap screws 7.

The conical roller bearings E, which rotatably support the adjacent inner ends of the axle sections A, comprise cones or inner bearing members 8 mounted on the reduced end portions of said sections, a doubly coned cup or outer bearing member 9 supported in the axle housing C, and conical rollers 10 interposed between the conical raceways of the cup and the respective cones.

The tops of the flared end portions of the axle housing C are provided adjacent to the inner ends of the outer bearings D with relatively large openings 11 that are closed by threaded plugs 12. The openings 11 serve as hand holes, into which the hand may be inserted when it is desired to inspect the outer bearings D. As shown in the drawings, the bottom of the axle housing C slopes downwardly from the middle toward each end, so that the lubricant drains towards the outer ends of said housing which serve as sumps in which lubricant is accumulated for lubricating the outer bearings D. Lubricant is supplied to the ends of the axle housing through holes 13 that are located in one side wall of said housing adjacent to the inner ends of the outer bearings D and are closed by threaded plugs 14.

Suitable means are provided for forming a lubricant chamber for enclosing the inner bearings E. Said means preferably comprises pressed steel closure members or cups 15 located in the axle housing C on opposite sides of the inner bearings E and thus forming between them a lubricant chamber F. These cup shaped closure members are provided with central circular openings adapted to accommodate the axle sections A and have their peripheral walls or flanges notched to form resilient sections or tabs 16 adapted to bear against the inner surface of the axle housing and thus retain the said closure members in place therein. The perforated end walls of the closure members 15 have leather wiper rings 17 riveted to the outer face thereof that closely embrace the axle sections. Metal sealing collars or rings 18 are sleeved on the axle sections between shoulders 19 thereon and the outer faces of the leather wiper rings 17 and thus serve to prevent outward sliding movement of the closure members 15 for the ends of the chamber F. With this arrangement, the closure members 15 cooperate with the axle housing to form a lubricant chamber for the inner bearings E, while the leather wiper rings 17 and metal sealing collars 18 serve to prevent the escape of oil through the axle receiving openings in said closure members.

Formed in the lower corners of the enlarged ends of the axle housing C are pockets or recesses 20, which communicate with the interior of said housing through openings 21 located adjacent to the inner and outer ends of the cups 3 of the outer roller bearings D. Formed in the lower portion of one side wall of the axle housing, opposite the chamber F for the two inner roller bearings E, is a pocket or recess 22, which communicates with the lower portion of said chamber through openings 23 located adjacent to the ends of the doubly coned cup 9 for said inner bearings. The pocket 22 may be supplied with lubricant through a threaded hole 24 which is closed by a threaded plug 25. Formed in the inner faces of the side walls of the axle housing are troughs or gutters 26, which extend inwardly and downwardly from points located adjacent to the inner ends of the cups 3 for the outer bearings D at substantially the level of the axes thereof to points located adjacent to the ends of the lubricant chamber F for the inner bearings and at some distance below the axes thereof. The troughs formed in the side wall of the housing, which has the pocket 22 formed therein, communicate at their inner ends with said pocket; and the troughs on the opposite side wall of the housing communicate at their inner ends with the inner bearing chamber F at points adjacent to the outer ends of the doubly coned cup 9 for the inner bearings E. When the axle is assembled, the inner bearing chamber F is supplied with lubricant through the hole 23 in the pocket 22 at the middle of the axle housing; but after the axle is in service, lubricant is supplied thereto through the holes 13 at the outer ends of said housing.

The operation of the axle is as follows: The outer bearings D run in lubricant that collects in the pockets 20 in the lower portions of the flared outer ends of the axle housing and operate to raise the lubricant from the bottom of the housing and throw it outwardly by centrifugal action into the outer ends of the inwardly and downwardly inclined troughs or gutters 26, which serve to convey or carry the lubricant by gravity to the lubricant chamber F for the inner bearings. The lubricant in the troughs on one side of the housing is conveyed directly to the chamber F, while the lubricant in the troughs on the other side of the housing is first conveyed into the pocket 22 and thence through the openings 23 at the ends of the bearing cup 9 for the inner bearings E into said chamber. When the lubricant in the inner bearing chamber F reaches the level of the inner ends of the troughs 26, it overflows into the axle housing and flows by gravity along the downwardly inclined bottom portion of the housing to the outer ends thereof where it is again picked up by the rotating outer bearings D and again deposited in the outer ends of the troughs 26 for delivery to the chamber F. It is noted that the amount of lubricant circulating between the inner and outer bearings increases with the increased speed of the axle.

Obviously, the hereinbefore described arrangement admits of considerable modification without departing from the invention, and I do not wish to be limited to the precise arrangement shown and described.

What I claim is:

1. A roller bearing axle construction comprising a housing, an axle therein, and bearings interposed between said housing and said axle adjacent to and intermediate the outer ends thereof, said housing being provided with the chamber for said intermediate bearing and being shaped at its outer ends to hold lubricant for the outer bearings, one side wall of said housing having a pocket formed therein that communicates with the lower portion of said chamber adjacent to the ends of the bearing therein, said housing having troughs in the interior surfaces of its side walls that slope downwardly from the end bearings to the chamber for the intermediate bearing, the troughs formed in the side wall having the pocket therein communicating with said pocket and the troughs in the other side wall communicating directly with said chamber.

2. A roller bearing axle construction comprising a housing, an axle therein, and bearings interposed between said housing and said axle adjacent to and intermediate the ends thereof, said housing being provided with a chamber for the intermediate bearing and having pockets at its outer ends adapted to contain lubricant for the end bearings, said housing being provided with troughs that slope downwardly from the end bearings at points substantially level with the axes thereof to the chamber for the intermediate bearing to convey lubricant thrown off by the end bearings to the chamber for the intermediate bearing, one side wall of said housing having a pocket therein that communicates with said chamber at opposite ends thereof, the troughs in said side wall communicating with said pocket and the troughs in the other side wall communicating directly with said chamber.

3. A roller bearing axle construction comprising a housing, an axle therein, and bearings interposed between said housing and said axle adjacent to and intermediate the ends thereof, said housing being provided with a chamber for the intermediate bearing and having pockets at its outer ends adapted to contain lubricant for the end bearings, said pockets communicating with the interior of said housing through openings located adjacent to the inner and outer ends of said end bearings, said housing being provided with troughs that slope downwardly from the end bearings to the chamber for the intermediate bearing to convey lubricant thrown off by the end bearings to the chamber for the intermediate bearing the bottom of said housing slope downwardly from the chamber for the intermediate bearing to the lubricant pockets for the end bearings for conveying surplus lubricant from said chamber to said pockets.

4. A roller bearing axle construction comprising a housing, an axle therein, bearings interposed between said housing and said axle at and intermediate the ends thereof, and closure members located in said housing opposite the ends of said intermediate bearing to form a lubricant containing chamber therefor, said closure members comprising cup shaped members sleeved on said axle and having peripheral portions that bear resiliently against the inner face of said housing.

5. A roller bearing axle construction comprising a housing, an axle therein, bearings interposed between said housing and said axle at and intermediate the ends thereof, closure members located in said housing opposite the ends of said intermediate bearing to form a lubricant containing chamber therefor, said closure members comprising cup shaped members sleeved on said axle and having peripheral portions that bear resiliently against the inner face of said housing, leather wiper rings fixed to said closure members and closely embracing said axle, and sealing rings sleeved on said axle between said wiper rings and shoulders on said axle.

Signed at Canton, Ohio, this 13th day of August 1929.

TRACY V. BUCKWALTER.